(12) United States Patent
Dati et al.

(10) Patent No.: US 7,379,516 B2
(45) Date of Patent: May 27, 2008

(54) EQUALIZATION AND INTERPOLATED TIMING RECOVERY FOR A PARTIAL RESPONSE CHANNEL

(75) Inventors: Angelo Dati, Viareggio (IT); Filippo Brenna, Villa Raverio (IT); Davide Giovenzana, Monza (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 801 days.

(21) Appl. No.: 10/189,348

(22) Filed: Jul. 2, 2002

(65) Prior Publication Data

US 2003/0026370 A1    Feb. 6, 2003

(30) Foreign Application Priority Data

Jul. 3, 2001    (EP) ................... 01830448

(51) Int. Cl.
*H04B 1/10* (2006.01)
*H03K 5/159* (2006.01)

(52) U.S. Cl. ............ 375/350; 375/232; 375/340

(58) Field of Classification Search ........ 375/232, 375/340, 344, 350; 708/300, 316, 319, 322, 708/323; 360/65
See application file for complete search history.

(56) References Cited

U.S. PATENT DOCUMENTS 5,901,010 A *  5/1999  Glover et al. ........... 360/78.12
5,966,415 A * 10/1999  Bliss et al. ............... 375/350
6,208,481 B1   3/2001  Behrens et al.
6,671,244 B2 * 12/2003  Honma .................. 369/59.22

OTHER PUBLICATIONS

Zi-Ning Wu, et al., "A MMSE interpolated timing recovery scheme for the magnetic recording channel", COMMUNICATIONS, 1997, ICC '97 Montreal, Towards the Knowledge Millenium, 1997 IEEE International Conference on Montreal, Que., Canada, Jun. 8-12, 1997, New York, NY, Jun. 8, 1997, pp. 1625-1629, XP010227027, ISBN: 0-7803-3925-8.
European Patent Office, European Search Report, Application No. EP 01 83 0448, Jan. 22, 2002, 2 pages.

* cited by examiner

*Primary Examiner*—Betsy L. Deppe
(74) *Attorney, Agent, or Firm*—Graybeal Jackson Haley LLP

(57) ABSTRACT

A receiver in a data read channel has an input terminal for receiving an input signal provided by a transmitter of the data read channel, and produces an output signal at an output terminal. The receiver includes a finite impulse response (FIR) filter coupled to the input terminal and having filter coefficients capable of being adapted, an interpolated timing-recovery circuit coupled to an output of the FIR filter, the timing-recovery circuit having an output signal coupled to the output terminal of the receiver, and a timer circuit coupled to the output terminal and feedback connected to the timing-recovery circuit, wherein the coefficients of the timing-recovery circuit are dynamically adapted using a cost weighted function through a signal power spectrum of the data read channel.

16 Claims, 6 Drawing Sheets

$$f_{k \in S}^{new} = f_{k \in S}^{old} - \varepsilon \cdot grad(|out_n - 1_n|^2)$$

constraints: S={-L, ..., -1, 2, ..., L}
$\{f_0\} = 1$
$\{f_1\} = $ constant

EQUALIZATION AND INTERPOLATED TIMING RECOVERY FOR A PARTIAL RESPONSE CHANNEL

PRIORITY CLAIM

This application claims priority from European patent application No. 01830448.5, filed Jul. 3, 2001, which is incorporated herein by reference.

TECHNICAL FIELD

The invention is directed generally to receivers in a data read channel, and more particularly, to a receiver in the data read channel of the type including:
- a finite impulse response (FIR) filter coupled to an input terminal and having filter coefficients capable of being adapted;
- an interpolated timing-recovery circuit coupled to an output of the FIR filter and generating an output signal that is the output of the receiver; and
- a timer circuit coupled to the output terminal and feedback connected to the timing-recovery circuit.

BACKGROUND

Computer-disk storage systems record digital data onto a surface of a storage medium, which is typically a rotating magnetic or optical disk, by changing a surface characteristic of the disk in a pattern determined by the digital data itself. The digital data determines how a write transducer (write head), operating at a predetermined speed, records binary sequences onto the disk surface. In magnetic recording systems, for example, the digital data modulates electric current in a write coil in order to record a series of magnetic flux transitions onto the surface of a magnetizable disk. Similarly, in optical recording systems, the digital data may modulate the intensity of a laser beam in order to record a series of "pits" onto the surface of an optical disk. Other systems, for instance, magneto-optical systems use a hybrid combination of the two. When reading the previously recorded data, a read transducer (read head), positioned near or otherwise sensing the surface of the spinning disk, senses the alterations on the medium and generates a sequence of corresponding pulses in an analog read signal. These pulses are then detected and decoded by read-channel circuitry in order to reproduce the digital sequence.

In a conventional analog read channel, detecting and decoding the pulses into a digital sequence can be performed by a simple peak detector. More recent designs find it preferable to use a discrete-time sequence detector in a sampled-amplitude read channel because, among other reasons, these systems compensate for intersymbol interference and are less susceptible to channel noise. Consequently, discrete-time sequence detectors increase the capacity, speed, and storage integrity of the storage system.

There are several well known discrete-time sequence detection methods including discrete-time pulse detection (DPD), decision-feedback equalization (DFE), partial response (PR) with Viterbi detection, maximum-likelihood sequence detection (MLSD), enhanced decision-feedback equalization (EDFE), as well as numerous others.

In a conventional peak-detection read channel, analog circuitry detects peaks in the continuous-time analog read signal generated by the read head. The analog read signal is "segmented" into bit cell periods and interpreted during these segments of time. A peak detected during a bit cell period may represent a binary "1" bit, whereas the absence of a peak may represent a binary "0" bit. Errors in detection occur when the bit cells are not correctly aligned with the analog pulse data. To this end, timing recovery in the read channel adjusts the bit cell periods so that the peaks occur in the center of the bit cells on average in order to minimize detection errors. Since timing information is derived only when peaks are detected, the input data stream is normally run-length limited (RLL) to limit the number of consecutive "0" bits.

One of the commonly used pieces of analog circuitry that detects the data in the continuous-time analog read signal generated by the read head is a Finite Impulse Response (FIR) filter. The FIR filter modifies (or filters) the original analog wave signal so that digital data can be more easily and accurately extrapolated from it. By developing better FIR filtering techniques, data reading devices can operate more quickly, at a higher frequency, and/or have increased data integrity and data reliability.

Sampled-amplitude detection such as that performed by a FIR filter requires timing recovery in order to correctly extract the digital sequence, and therefore a timing-recovery circuit is also part of the analog circuitry used to read a data channel. Rather than process the continuous signal to align peaks to the center of bit cell periods as in peak-detection systems, sampled-amplitude systems synchronize the pulse samples to the frequency of the data transmission. In conventional sampled-amplitude read channels, timing recovery synchronizes a sampling clock by minimizing an error between the signal sample values and estimated sample values. A pulse detector determines the estimated sample values from the read-signal samples. Even in the presence of intersymbol interference the sample values can be estimated and, together with the signal sample values, used to synchronize the sampling of the analog pulses in a decision-directed feedback system.

Therefore, in addition to creating better FIR filters, new techniques and circuits in timing recovery can be used to help create data storage devices with higher capacity, increased accuracy, and lower cost.

A standard use of a FIR filter according to the prior art is shown in FIG. 1. In that figure, a data system 10 is shown. The data system 10 can be a component part of any device that uses a receiver 20 including a FIR filter, such as those described above. The data system 10 includes a transmitter response and transmission channel 12, that sends an impulse response l(t) that the receiver 20 receives as an input signal s(t). Within the receiver 20 is a filter 22, such as a low pass filter, a FIR filter 24, and a timer-recovery circuit 26. The output of the FIR filter 24 is provided to the timing-recovery circuit 26, which, when used in conjunction with the FIR filter 24, is used to create an output signal $r(t_k)$. It is the goal of the output signal to be identical to a target response h(t), which is the expected readback signal shape used by the receiver 20 to estimate the patterns on the surface of the disk. The signals s(t) and $r(t_k)$ are defined by the following equations:

$$s(t) = \sum_{k=-\infty}^{\infty} a_k \cdot 1(t - kT) \tag{1}$$

$$r(t_k) = \sum_{m=-\infty}^{\infty} a_m \cdot h(t_k - mT) \tag{2}$$

where $t_k = kT + \phi T \ldots 0 \leq \phi < 1$

One type of timer recovery circuit 26 is called an Interpolated Timing Recovery (ITR) circuit. These circuits stem from reconstruction criteria of a sampled signal s(t). A continuous-time waveform signal can be recovered without information loss from its samples provided that the Nyquist sampling criterion is met. This criterion is met when a waveform is sampled at a rate at least twice its highest frequency.

To reconstruct the signal provided to the FIR filter, the following reconstruction formula is used:

$$s(t) = \sum_{n=-\infty}^{\infty} s(nT_S) \cdot \text{sinc}(t - nT_S) \tag{3}$$

where sin c(t)=sin(πt)/πt

Through filtering the incoming samples through a finite-length approximation of the sin c function, the correct phase of the signal s(t) can be recovered. The mean-squares optimization of the interpolating filter $g_k$ yields:

$$\min \int_{-1/2}^{1/2} \left| \sum_{k=-L}^{L} g_k \cdot e^{-i2\pi k f} - e^{-i\varphi} \right|^2 df \tag{4}$$

where $g_k$=sin c(k-φ)

FIG. 2A shows an example diagram of a filtering circuit 30 including a combination of a FIR filter and a ITR circuit known in the prior art. A FIR filter 24 couples to the ITR circuit 26, similar to that shown in FIG. 1. The ITR circuit 26 includes N phase shifters (individually labeled 28-1, 28-2, . . . 28-N), or filter tap sets to shift the input signal received from the FIR filter 24. Each phase shifter 28 is operable during a different time period of a sampling period. The number N of different phase shifters 28 in the ITR 26 is determined as the set number of intervals of the sampling period. This number is chosen as a trade-off between system performance and implementation complexity. The ITR circuit 26 includes a multiplexer MUX that provides the shifted input signal from a selected one of the phase shifters 28 to thereby provide the output of the ITR circuit.

The output of the ITR 26 is the output of the filtering circuit 30. This output is fed-back into a timing controller 32 that generates two timing signals, which are coupled to the ITR 26 and a Filter Coefficient Adaptation unit (FCA) 34. The FCA 34 provides FIR filter coefficient updates. When enabled, the FCA 34 provides estimated updated FIR filter coefficients, based on an internal adaptation algorithm. The FCA 34 is enabled based on the state of an enable signal generated by the timing controller 32. Additionally, the timing controller 32 generates a signal to control a selection of the proper interpolating phase (Tau).

In operation, the data-read-channel signal is received by the FIR filter 24 and passes it to the ITR 26. In each sampling period, the timing controller 32 selects the appropriate sampling phase among the N available. At each sampling period, only one phase out of N is selected.

The FCA 34 operates only when the first phase shifter 28-1 is active in the ITR 26. The reason for this is that the adaptation rate for the FIR filter (performed by the FCA 34) and the selection process of the ITR phase shifters 28 (performed by the timing controller 32) need to occur at very different rates. The selection of ITR phase shifters must be achieved quickly to keep up with relatively large sampling jitters, but the FIR convergence is achieved on a PR system over a time span of thousands of samples. Because there is only a predefined subset of ITR responses, one for each phase connection quantization, there is no problem for ITR stability. To guarantee adaptation convergence for the FIR filter leads to much slower updating.

In present systems, the FIR-coefficient adaptation is updated only over a subset of sampling phases. The easiest phase to perform the adaptation is when the first phase shifter 28-1 is in operation, or stated otherwise, when the interpolating phase φ is "close" to zero. In this phase, the FIR filter 24 does not need to compensate for any fixed group delay, which in turn means that the FIR filter can be of minimal length. However, this means that there is no possibility to compensate any further spectrum distortion due to the finite length of the ITR 26.

FIG. 2B shows a graph of a sampling period divided into 360°. The phase shifters 28 from FIG. 2A are represented as square boxes, with the phase shifter 28-1 shaded, while the rest of the phase shifters are not shaded. The shading for the phase shifter 28-1 indicates that the FCA 34 updates the filter coefficients for the FIR filter 24 only during the time when the phase shifter 28-1 is active. In all of the other times of the sampling period, i.e. when the phase shifter 28-1 is inactive, no coefficients for the FIR filter 24 are being updated.

A standard way to dynamically adapt coefficients for a FIR filter system is to use a stochastic gradient method. FIG. 3 shows the feedback mechanism used in the adaptation. The FIR filter 24 has a set of coefficients $\{f_k\}$. The signal output from the FIR filter 24 is passed to a FIR adaptation device 40, which could be the Filter Coefficient Adaptation unit 34 of FIG. 2A. The adaptation device 40 produces sample-level estimates, which are combined with the signal input to the FIR filter 24 to create updated coefficients that are passed to the FIR filter as updated coefficients. One method of adaptation of a FIR filter uses a stochastic gradient method as shown in Equation (5).

$$f_{k \in S}^{new} = f_{k \in S}^{old} - \varepsilon \cdot grad(|out_n - 1_n|^2) \tag{5}$$

under the constraints: S={-L, . . . , -1, 2, . . . , L}; $\{f_0\}$=1; $\{f_1\}$=constant.

This or similar criteria avoid convergence to the trivial solution with all zero values for the FIR taps.

One technical problem not solved by the prior art is how to jointly optimize, in a Partial-Response-channel filtering system, both the equalizer and timing-interpolation filters.

SUMMARY OF THE INVENTION

In one aspect of the invention, the solution to the above-stated technical problem is achieved by providing an architecture that allows the switching of FIR filters that can have their coefficients adapted even when an Interpolated Timing Recovery circuit is at a non-zero phase.

BRIEF DESCRIPTION OF THE DRAWINGS

The characteristics and advantages of the device and method according to the invention will be seen from the description, following herein, of an embodiment given as an indication and not limiting with reference to the drawings attached.

DETAILED DESCRIPTION

Figure 4A:
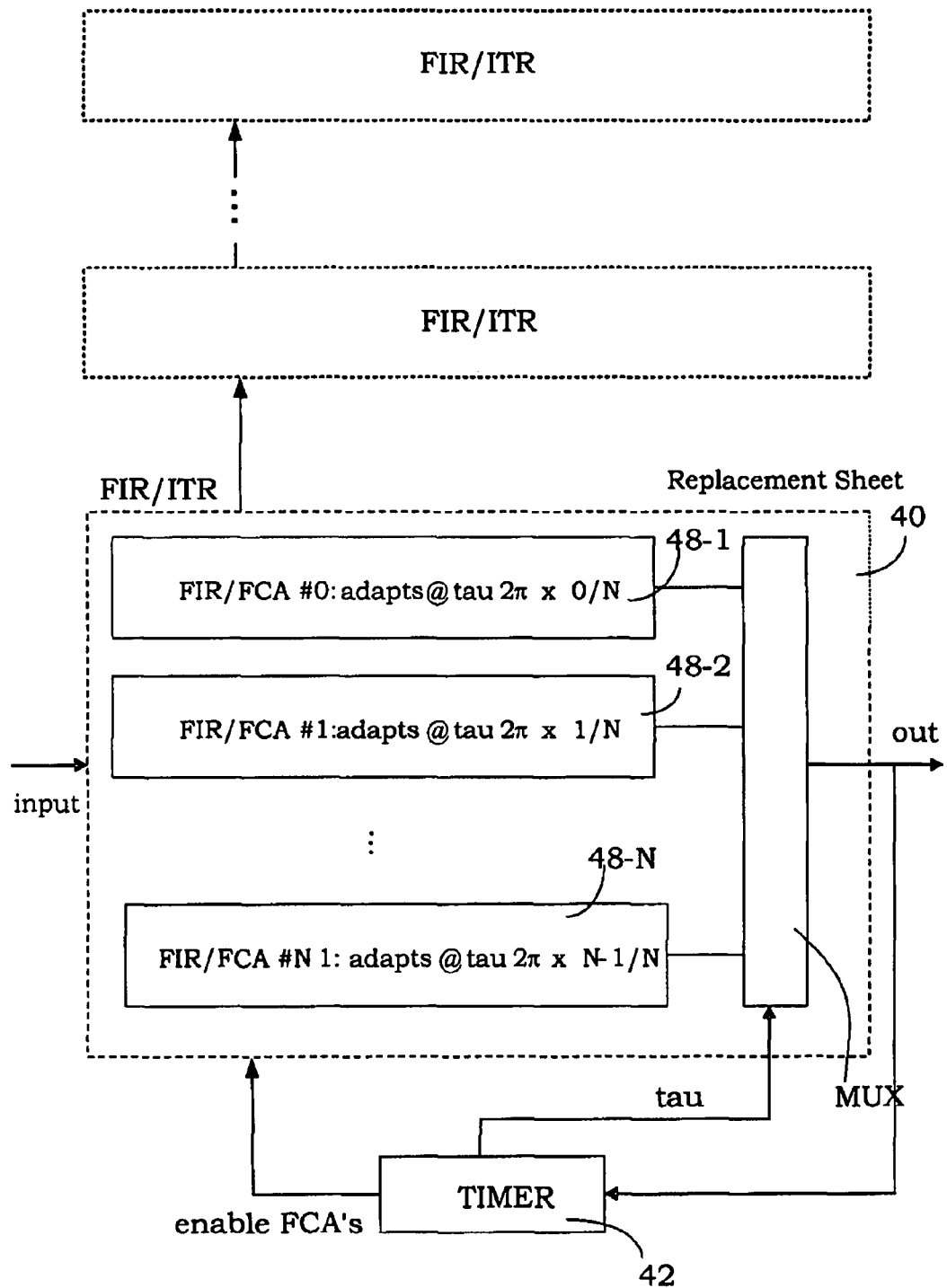
FIG. 4A is a adapted FIR/ITR combination according to an embodiment of the invention.

FIG. 4A is an adapted FIR/ITR combination according to an embodiment of the invention. In this embodiment, and different from the prior art, there is no distinction between the equalization (FIR) and interpolation (ITR) stages. Included in a FIR/ITR combination filter 40 are a number of stages 48 that perform both equalization and interpolation during the same phases of the sample period. Feedback connected to the filter 40 is a timer circuit 42, similar in function to the timer circuit 32 of FIG. 2A, in that it is responsible for selecting the FIR coefficient setup associated with the estimated sampling period. A multiplexer MUX provides the output from a selected one of the stages 48 as the output from the filter 40.

In the filter 40, there are N different phase shifters 48 (48-1, 48-2, . . . , 48-N). Differently from the prior-art circuit of FIG. 2A, each interpolation phase shifter 48 also includes a set of preset FIR coefficients that is capable of equalizing the entire PR channel, including timing interpolation, in a single phase.

Switching among more than one FIR filters can be achieved in a single sample phase, therefore this setup does not add extra latency with respect to the prior-art implementation, and hence does not impact the timer 42 design constraints. Timer 42 is typically a PLL filter. In one embodiment, a data read channel includes a plurality of equalization and interpolated timing recovery circuits, such as the filter 40. One of the filters 40 is active at any given time in the sampling period. The signal from the timer circuit 42 also determines which of the plurality of filters 40 is to be active at any given time.

This setup allows the filter 40 to perform slow channel optimization independently over all of the N filters by letting them adapt only when their corresponding phase is selected by the timer 42. As each filter in the bank has a dedicated set of registers for its coefficients, there is no interaction between timing and channel frequency-response shaping.

Figure 3:
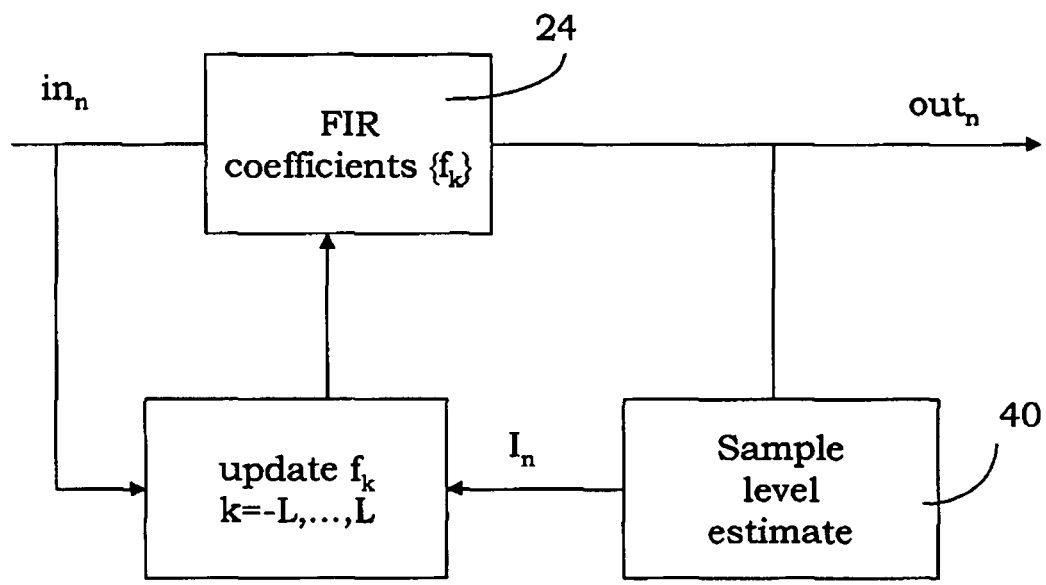
FIG. 3 is a diagram showing the feedback mechanism to dynamically adapt coefficients for a FIR filter system according to the prior art.

For each sampling phase, a custom adaptation constraint is provided as was described above with reference to FIG. 3. This allows channel adaptation over all possible phases, and, differently from the prior art, not just over the phase that is "close" to zero. This enables the adaptation of the filter coefficients to trade effectively among timing interpolation and frequency shaping errors. ITR truncation is adaptively compensated through the same adaptation scheme previously reserved only to the first FIR stage (FIG. 3). Initial setup for each FIR and sampling phase combination can be preset using the gradient scheme explained above.

Figure 1:
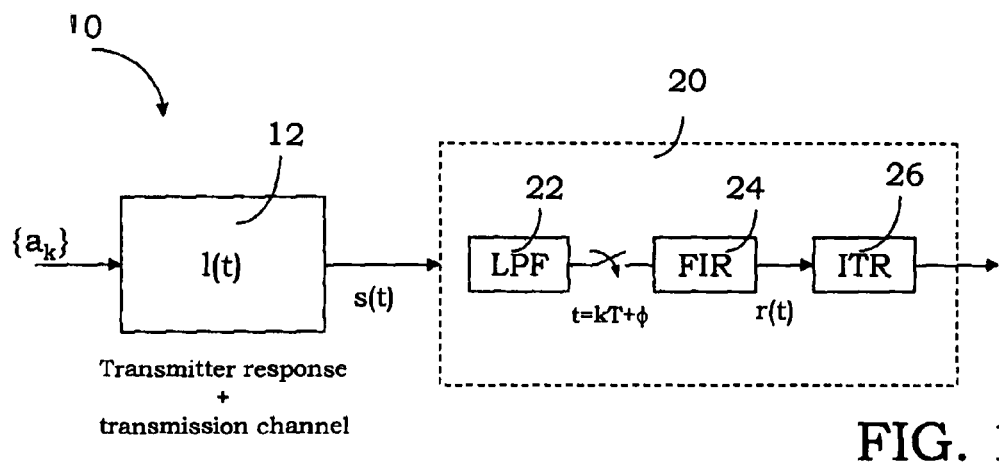
FIG. 1 is a functional block diagram of a Partial Response channel for decoding an analog stream of data.
Figure 2A:
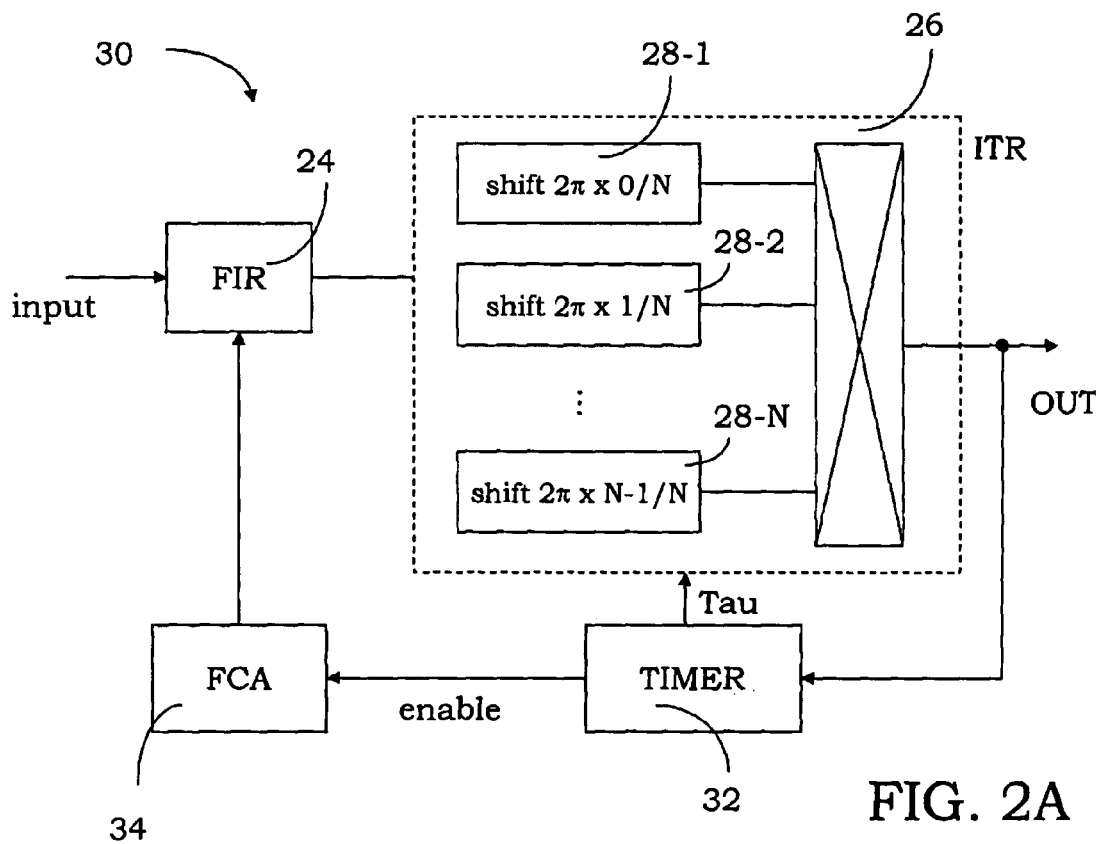
FIG. 2A is a functional block diagram showing additional detail of the Partial Response channel of FIG. 1.
Figure 2B:
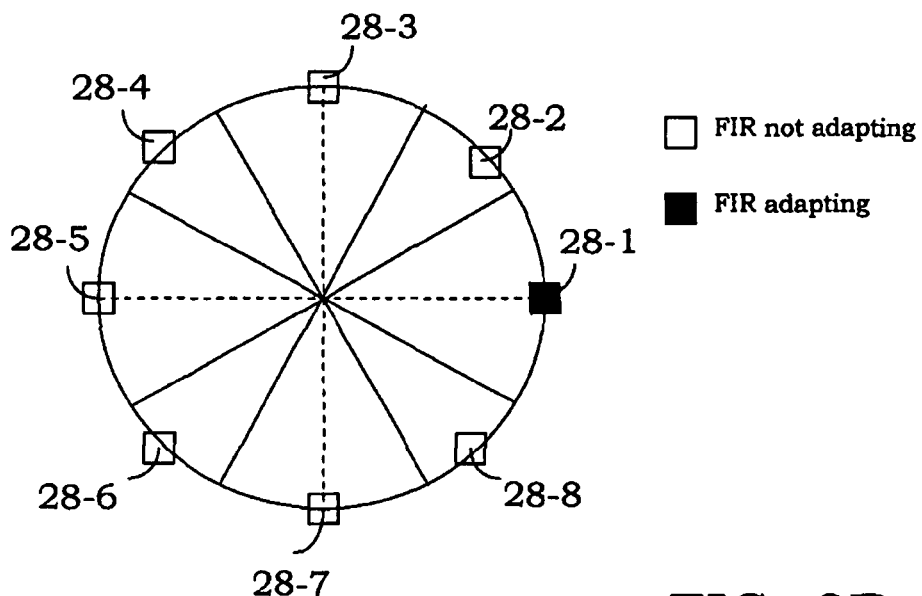
FIG. 2B is a diagram showing timing considerations for the circuit shown in FIG. 2A.

There can be much sharing among the sets of hardware in the phases 48, which can leave the circuit of FIG. 4A much improved over the circuit of the prior art shown in FIG. 2A. The implementation of this hardware can be made without complexity.

Figure 4B:
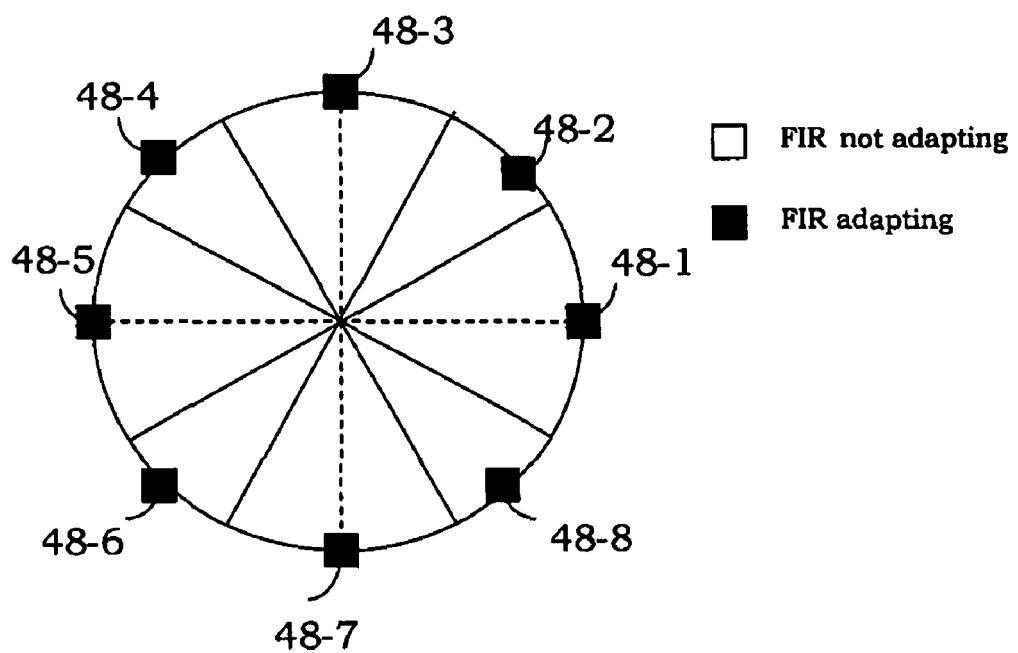
FIG. 4B is a diagram showing timing considerations for the circuit shown in FIG. 4A.

FIG. 4B shows a graph of the sampling period of the FIR/ITR filter 40 of FIG. 4A. In this scenario, the FIR is adapting in each of the different phases, as indicated by shading in all of the phase shifters 48 This graph shows that in the FIR/ITR filter 40, N filter banks slowly adapt to equalize the channel for a given sampling phase.

Figure 5A:
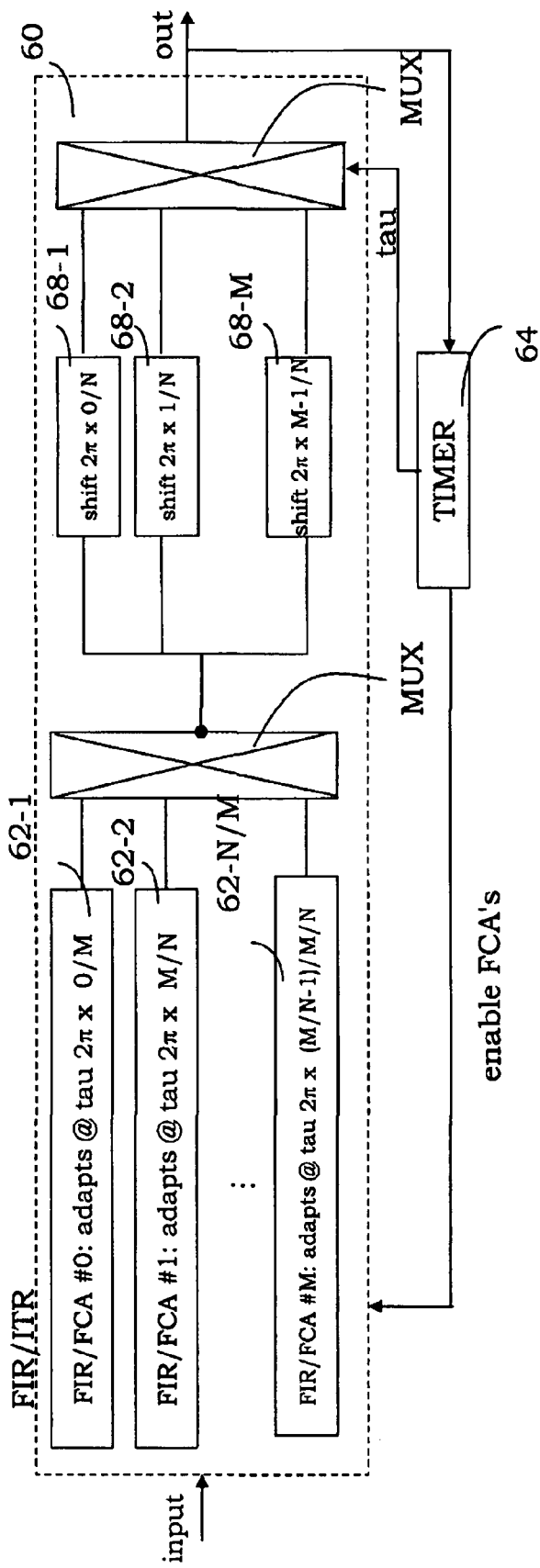
FIG. 5A is an adapted FIR/ITR combination according to an embodiment of the invention.

FIG. 5A shows another embodiment of the invention, a FIR/ITR filter 60, which is a hybrid of the examples shown in FIGS. 2A and 4A. In this example, with N interpolating phases, as before, there are only M phase shifters 68, with M<<N. Additionally, there are N/M adaptive FIR banks 62, with a selected one of the FIR banks being output from the filter 60 via a multiplexer MUX. The phase shifters 68 compensate a shift in the [-M/2(N), M/(2N) ] range, where the distortion introduced by a short shifter is the smallest. This thus limits the disadvantage of the filter shown in FIG. 2A to a phase range where the ITR interpolation error is least significant. A timer circuit 64, to recover a phase shift φ, uses the particular FIR/ITR filter 62 associated with phase Θ=round(φ/M) and an interpolation selection to recover a shift of θ=φ−Θ. One of the reasons for reverting part of the structure back to the original scheme is not hardware complexity, but time required to set up the entire filter bank. If each configuration were loaded serially, as is currently being done in PRML Read/Write channels, a solution as shown in FIG. 4A that had 64 possible interpolating phases and a 12-tap ITR, vs a 5-tap FIR-ITR filter 60 as shown in FIG. 5A, it would take:

(12−1)*64/(5−1)=176 times longer to configure the FIR-ITR cascade filter 40 than the one shown in FIG. 2A. This could be a drawback in some cases of disk drive applications where the FIR coefficients must be downloaded at each disk sector onset, through a standard serial interface. In this case, a controlled amount of the adaptation capability can be sacrificed to speed up the download, which will also save some of the setup memory. Partitioning, for instance, the bit time in 4 sections, there would be a bank of only 6 filters and an ITR that needs to recover only 0.083 of the bit cell (against 0.5 in the situation shown in FIG. 2A), and a 176/6≈30 times more time to load than the situation shown in FIG. 2A.

Figure 5B:
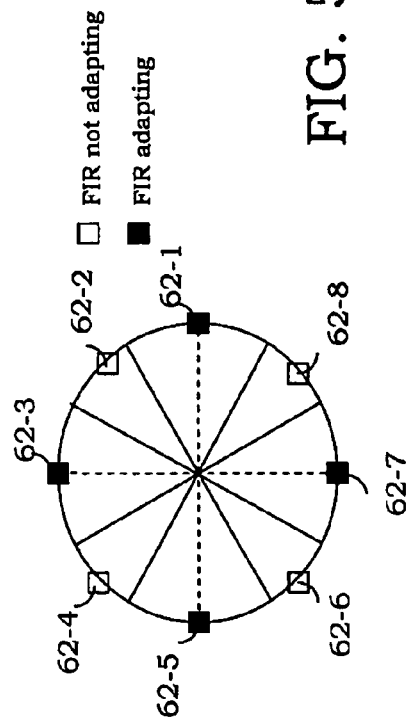
FIG. 5B is a diagram showing timing considerations for the circuit shown in FIG. 5A.

FIG. 5B shows the phases in the sampling period for which the FIR/ITR filter 60 of FIG. 5A is active. Through proper setup of the timer circuit 64, as many or as few of the phases in the sampling period can be those where the FIR stage of the FIR/ITR filter 60 is adapting.

As mentioned above, there are great differences in the speed requirements of timing recovery and channel identification–pulse shaping. It is noted that the solutions shown in FIGS. 4A and 5A can combine the two optimization-loop requirements to ensure that there is no interference and no design trade off.

As for implementation of the solution shown in FIG. 4A, there is no need to implement a separate FIR for each interpolating phase. There is rather only a need for extra storage capability for copies of the filter taps not under current selection and the capability of switching between a pair of coefficient sets within a single sample cycle.

Additionally, a new optimization for coefficients in the ITR phase shifters 28 and 68 (FIGS. 2A and 5A) can be performed using a new weighted-optimization technique as explained below. The below-described optimization is already embedded into the stages 48 of the FIR/ITR combination filter 40 shown in FIG. 4A, thus need not be performed for those stages. In the scheme shown in FIG. 2A, the weighted-optimization technique can be performed in the phase shifters 28, and in the scheme shown in FIG. 5A, the weighted-optimization technique can be performed in the phase shifters 68.

In a PR channel, the ITR filter is connected to the output of a FIR filter which strives to match a target spectrum T(f). The ITR can be optimized for a finite length once given the additional information over the signal spectrum. The optimization criteria of equation (4) above can be modified as follows:

$$\min \int_{-1/2}^{1/2} \left| \sum_{k=-L}^{L} g_k \cdot e^{-i2\pi k f} \cdot T(f) - e^{-i\varphi} \cdot T(f) \right|^2 df \quad (6)$$

and corresponds to weighting the cost function through the signal power spectrum T(f) T(f)*. Solving for the optimum set of {g} coefficients for a given target T(f) yields the following results.

In solving for the optimum results, the simple constraints for {$f_0$} and {$f_1$} discussed with reference to FIG. 3 are insufficient. Instead, a general set of constraints is imposed to recover also a non-zero group delay in the FIR, which is: {$f_0$}=sin c($\phi$); and {$f_1$}=constant+sin c($\phi$−1).

For a noiseless PR channel with an impulse response $t_k = \delta_k - \delta_{k-2}$, (PR4) the optimum ITR coefficients satisfy the modified equation:

$$g_k - 1/2 g_{k-2} - 1/2 g_{k+2} = \quad (7)$$
$$\text{sinc}(k - \varphi) - 1/2 \text{sinc}(k - \varphi + 2) - 1/2 \text{sinc}(k - \varphi - 2)$$

The same technique yields for an EPR4 response $t_k = \delta_k + \delta_{k-1} - \delta_{k-2} - \delta_{k-3}$:

$$g_k + 1/4(g_{k-1} + g_{k+1}) - 1/2(g_{k-2} + g_{k+2}) - 1/4(g_{k-3} + g_{k+3}) = \quad (8)$$
$$\text{sinc}(k - \varphi) + 1/4 \text{sinc}(k - \varphi - 1) + 1/4 \text{sinc}(k - \varphi + 1) -$$
$$1/2 \text{sinc}(k - \varphi - 2) - 1/4 \text{sinc}(k - \varphi - 3) -$$
$$1/4 \text{sinc}(k - \varphi + 3) - 1/2 \text{sinc}(k - \varphi + 2)$$

If the interpolator is optimized in this way, there is approximately a 3 db improvement over the interpolation error when compared to the traditional sin c solution for an 8-tap structure for the PR4 solution.

Figure 6:
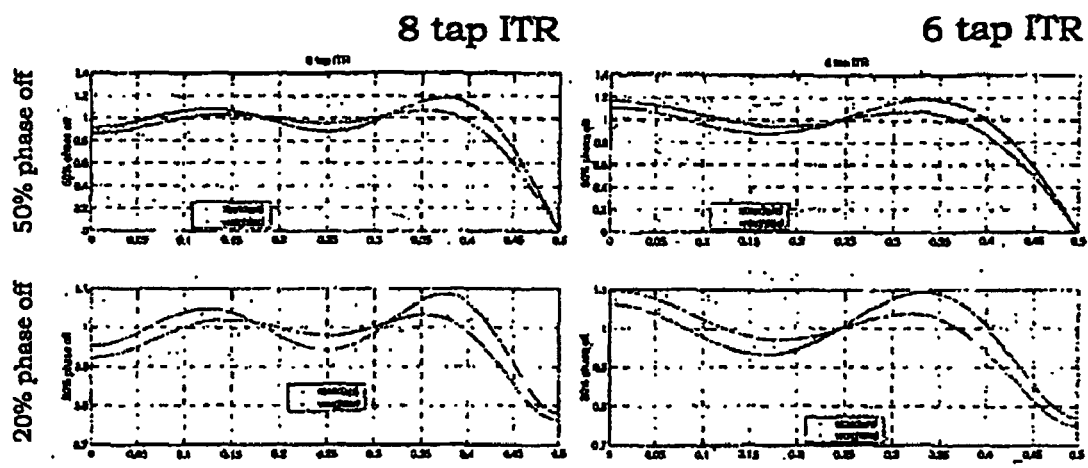
FIG. 6 is a plot showing a frequency-response amplitude for two sample systems, an 8-tap ITR and a 6-tap ITR.
Figure 7:
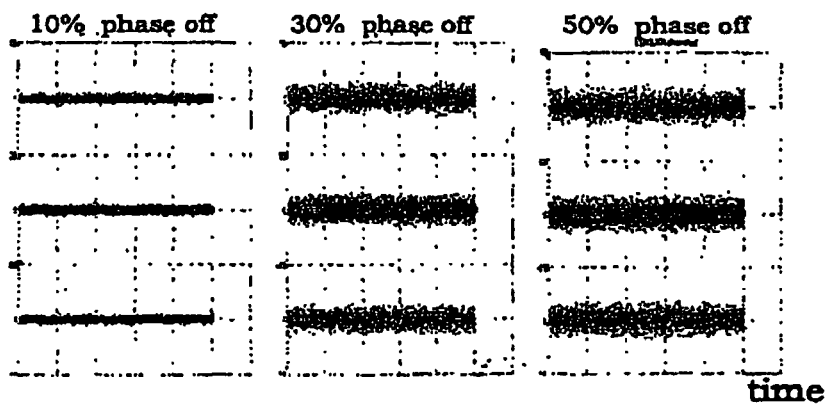
FIG. 7 is a timeplot of signal levels as they would be seen on an oscilloscope for a non-weighted standard according to the prior art.
Figure 8:
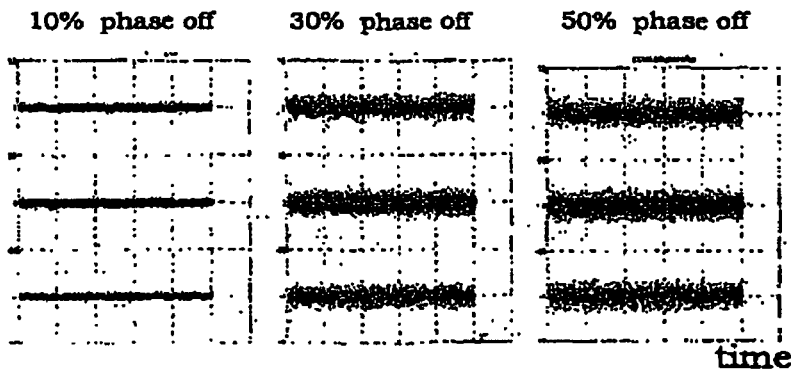
FIG. 8 is a timeplot of signal levels as they would be seen on an oscilloscope for a weighted optimization according to embodiments of the invention.

Examples of the improvement can be seen in FIGS. 6, 7 and 8. FIG. 6 shows a frequency-response amplitude plot for two sample systems, an 8-tap ITR and a 6-tap ITR. Both interpolations are shown, the "standard" that uses the typical weighting explained with reference to equation (5), while the "weighted" interpolation uses the weighting explained with reference to equation (6). The horizontal axis of these plots tracks the performance from 0 to 1/(2T), which is ½ of the Nyquist band.

FIGS. 7 and 8 are timeplots of the signal levels as they would be seen on an oscilloscope. The three plots in each figure show different amounts of phase offset, 10%, 30% or 50%. FIG. 7 shows the output using the prior-art standard interpolation, while FIG. 8 shows that using the weighted interpolation provides better results in that the data are more tightly centered around the particular levels.

This inventive weighting method can be used with the phase shifters 28 of the ITR 26 in the prior-art filter 30 of FIG. 2A to create a better working filter by using a FIR filter 24 that implements the timing-interpolation technique that is optimized using the design scheme described with reference to FIG. 3. The ITR shaping relies on a complete equalization recovery from the FIR filter 24, this is not adaptive. Timing adaptation is achieved by switching among a bank of pre-selected phase shifters 28 for a fast phase tracking. Since a perfect phase interpolation would require quite a long structure as this filter is approximating a rectangle in the frequency domain, the truncation error introduced after the ITR yields an unavoidable degradation of the channel equalization. The ITR in fact needs to compensate a maximum 50% phase shift with low distortion. For instance, in this case a 5-tap FIR with an 8-tap ITR could be used. This would be equivalent to a 12-tap single FIR but with only a subset of adapting coefficients. In this scenario, the ITR does not contribute to the equalization.

The principles disclosed herein are applicable regardless as to the particular discrete-time sequence detection method employed. The present invention applies to the above-identified sequence detection methods as well as others not mentioned, and even future techniques.

The invention claimed is:

1. A data read receiver having an input terminal for receiving an input signal and producing an output signal at an output terminal, and comprising:
    an equalization and interpolated timing recovery circuit inserted between an input and an output terminal of the data read receiver; and
    a timer circuit coupled to the output terminal of the data read receiver and feedback connected to the equalization and interpolated timing recovery circuit;
    wherein said equalization and interpolated timing recovery circuit comprises a plurality of FIR equalization/interpolation stages inserted between the input terminal of the data read receiver and a MUX selection block driven by said timer circuit, in turn connected to the output terminal of the data read receiver, said FIR equalization/interpolation stages having preset filter FIR coefficients capable of being adapted in order to perform equalization and timing interpolation in a single phase, and in that the equalization and interpolated timing recovery circuit performs slow channel optimization independently over all of the stages by letting them adapt only when selected by the said timer circuit, the selected FIR equalization/interpolation stage being connected, through said MUX selection block, to the output terminal of the data read receiver at any given time in a sampling period.

2. A data read receiver according to claim 1, wherein a signal is supplied from the timer circuit to the FIR equalization/interpolation stages in order to determine the selected FIR equalization/interpolation stage to be active at any given time.

3. A data read receiver according to claim 2, wherein it comprises a plurality of equalization and interpolated timing recovery circuits, one of which is active at any given time in the sampling period, and wherein the signal from the timer circuit also determines which of the plurality of equalization and interpolated timing recovery circuits is to be active at any given time.

4. A data read receiver according to claim 3, wherein the number of FIR equalization/interpolation stages is identical to a corresponding number of phase shifters.

5. A data read receiver according to claim 1 wherein the data read receiver further comprises a plurality of phase shifters inserted between the plurality of FIR equalization/interpolation stages and the MUX selection block.

6. A data read receiver according to claim 1 further comprising a number of chase shifters and wherein the number of FIR equalization/interpolation stages is different from the number of phase shifters, and in that the equalization and interpolated timing recovery circuit further comprises a supplemental MUX selection block inserted between the FIR equalization/interpolation stages and the phase shifters.

7. A data read receiver according to claim 6 wherein the timer circuit generates two signals, a first supplied to the plurality of FIR equalization/interpolation stages, and a second supplied to the MUX selection block.

8. A data read receiver according to claim 6, wherein the equalization and interpolated timing recovery circuit can be dynamically adapted in M number of stages, where M is any number between 1 and the number of phase shifters.

9. A method for optimizing the equalization and interpolation function of a data read channel, comprising the steps of:
receiving an input signal;
selecting one of a plurality of equalization and interpolated timing recovery circuits to be active in a given phase of a sampling period of the data read channel;
wherein the method further comprises the steps of:
selecting one of a plurality of finite impulse response (FIR) filters to actively filter the data read channel in any given phase of a sampling period; and
dynamically adapting coefficients of at least two selected FIR filters in the sampling period.

10. A method according to claim 9, wherein the dynamic adaptation of coefficients of the FIR filters occurs for each phase of the sampling period.

11. A method according to claim 9, wherein the adaptation of coefficients uses a set of constraints to recover a non-zero group delay in the FIR filters.

12. A method according to claim 11, wherein the constraints are: $\{f_0\}=\sin c(\phi)$; and $\{f_1\}=\text{constant}+\sin c((\phi-1)$ where $f_0$ and $f_1$ are filter coefficients and $\phi$ is a phase shift.

13. The method according to claim 9 wherein the dynamic adaptation of coefficients of the FIR filters uses a cost weighted function through the input signal power spectrum.

14. A read channel circuit, comprising:
a timer operable to generate a first timing signal in response to a filtered read signal; and
a plurality of phase shifters, wherein each phase shifter is coupled to the timer,
comprising a respective set of filter coefficients,
operable to receive a read signal having a frequency response,
operable to generate the filtered read signal in response to a respective value of the timing signal by shaping the frequency response of the read signal according to a target frequency response and by compensating for a respective phase shift in a sample of the read signal, and
operable to periodically update the filter coefficients in response to the first timing signal.

15. The read channel circuit of claim 14, further comprising:
an output node; and
a multiplexer coupled to the phase shifters, to the output node, and to the timer, the multiplexer operable to couple to the output node the filtered read signal from the one of the phase shifters corresponding to the value of a second timing signal.

16. The read channel circuit of claim 14 wherein each of the plurality of phase shifters:
comprises a respective set of phase-recovery coefficients; and
is further operable to optimize the phase-recovery coefficients using a cost-weighted function through the target frequency response.

* * * * *

UNITED STATES PATENT AND TRADEMARK OFFICE
CERTIFICATE OF CORRECTION

PATENT NO. : 7,379,516 B2  Page 1 of 1
APPLICATION NO. : 10/189348
DATED : May 27, 2008
INVENTOR(S) : Angelo Dati, Filippo Brenna and Davide Giovenzana It is certified that error appears in the above-identified patent and that said Letters Patent is hereby corrected as shown below:

Column 10 Claim 12 Line 5; [ $\{f0\} = \sin c(\varphi)$], replace with --$\{f0\} = \text{sinc}(\varphi)$--
Column 10 Claim 12 Line 5; [ $\{f1\} = \text{constant} + \sin c(\varphi-1)$], replace with --$\{f1\} = \text{constant} + \text{sinc}(\varphi-1)$--

Signed and Sealed this

Twelfth Day of August, 2008

JON W. DUDAS
*Director of the United States Patent and Trademark Office*